United States Patent [19]

Tisma

[11] Patent Number: 5,388,389
[45] Date of Patent: Feb. 14, 1995

[54] AUTOMATIC PACKAGING EQUIPMENT

[76] Inventor: Stevan Tisma, c/o 4640 N. Elston, Chicago, Ill. 60630

[21] Appl. No.: 180,110

[22] Filed: Jan. 12, 1994

Related U.S. Application Data

[60] Division of Ser. No. 984,087, Dec. 1, 1992, abandoned, which is a continuation of Ser. No. 858,888, Mar. 27, 1992, Pat. No. 5,185,984, which is a continuation-in-part of Ser. No. 762,497, Sep. 19, 1991, Pat. No. 5,170,610, which is a continuation-in-part of Ser. No. 508,269, Apr. 11, 1990, Pat. No. 5,072,573, which is a continuation-in-part of Ser. No. 464,162, Jan. 12, 1990, abandoned.

[51] Int. Cl.6 ...................... B65B 39/02; B65B /39/14
[52] U.S. Cl. ......................................... 53/473; 53/252; 53/257; 53/566; 53/579
[58] Field of Search .................. 53/252, 257, 258, 260, 53/261, 255, 251, 250, 566, 579, 578, 249, 473

[56] References Cited

U.S. PATENT DOCUMENTS

| | | | |
|---|---|---|---|
| 3,608,701 | 9/1971 | Dieter | 53/258 X |
| 4,211,054 | 7/1980 | Sramek | 53/566 X |
| 4,738,083 | 4/1988 | Kawai et al. | 53/579 |
| 5,095,960 | 3/1992 | Grundler et al. | 53/261 X |
| 5,175,976 | 1/1993 | Petry et al. | 53/566 X |
| 5,185,984 | 2/1993 | Tisma | 53/566 X |

Primary Examiner—James F. Coan
Attorney, Agent, or Firm—Laff, Whitesel, Conte & Saret, Ltd.

[57] ABSTRACT

An automatic packaging machine comprises a spaced parallel pair of conveyor chains for transporting a plurality of mandrels. A pair of guide rails connected between the conveyor chains for slidably carrying each mandrel, so that a mandrel may be moved in a product transport position to a loading station. At the loading station, the mandrel is thrust forward to confront a box so that the product may be pushed into a box. The mandrel may be made wider to accept product without a precise alignment between mandrel and product or more narrow to fit the product into a box at the loading station. Two cam slots are provided to independently control the thrust position and the width of the mandrel. A stabilization support provides enough play to dissipate centrifugal force and thereby enable the machine to operate at a higher speed.

8 Claims, 10 Drawing Sheets

AUTOMATIC PACKAGING EQUIPMENT

This application is a division of application Ser. No. 07/984,087 filed Dec. 01, 1992, now abandoned, which is a continuation of application Ser. No. 07/858,888 filed Mar. 27, 1992, now U.S. Pat. No. 5,185,984 which in turn is a continuation-in-part of Ser. No. 07/762,497, filed Sep. 19, 1991, now U.S. Pat. No. 5,170,610, which in turn is a continuation-in-part of Ser. No. 07/508,269, filed Apr. 11, 1990, now U.S. Pat. No. 5,072,573, which was a continuation-in-part of Ser. No. 07/464,162 filed Jan. 12, 1990, now abandoned.

This invention relates to automatic packaging equipment and more particularly to simplified equipment which uses less parts and which is subject to fewer Jams and other malfunctions.

References is made to my following patents which show some of the predecessors of equipment shown and described herein: U.S. Pat. Nos. 4,491,267; 4,578,929; 4,713,928; 4,716,714; 4,738,081; 4,745,732; 4,829,751; 4,856,566; 4,982,556; 5,010,929; 5,058,634; and 5,072,573.

These aforementioned patents have taught several principles which are combined and enlarged by the present invention. A first of the principles (U.S. Pat. No. 5,072,573) involves a product carrying mandrel which may be made wider to receive product so that it may be dropped less accurately or may be a randomly sized or shaped product. For, example, a bag of potato chips may vary greatly from thick to thin in one direction and from wide to narrow in another direction. Thus, the mandrel may be made wide enough to receive every bag of potato chips regardless of how misshapen it may be. Then the mandrel may be made narrow to shape the product to fit within a box.

Another principle shown in the foregoing patents involves thrusting the mandrel forward in order to position it near a box or other receptacle. (U.S. Pat. Nos. 4,829,751; 4,982,556; and 5,072,573). Thereafter, a pusher pushes the product from the forwardly positioned mandrel into the box. Without the forward thrust an extra conveyor was required to bridge a gap between the mandrel and the box. With or without the forward thrust this transfer feature has sometimes led to a misalignment between product and box which caused the machine to Jam.

Still another principle shown in these patents involved a stabilization bar which provided a mount that absorbed centrifugal forces as the mandrel circled a sprocket wheel powering a chain link conveyor. When the packaging machine is run at the high speeds which are now possible, the mandrel had sometimes slammed into the link chain as it rounded the sprocket. The stabilization bar has smoothed the circular excursion of the mandrel and dissipated the centrifugal forces so that the slamming no longer occurs.

Each of these features offered great improvements over previously available automatic packaging machines; however, there were problems when efforts were made to combine them. Sometimes the mandrel with an adjustable width tended to lose its width adjustment if an effort was made to thrust it forward. If the stabilization bar was added, the width adjustment may become even more difficult. To prevent the Jam at the point of loading product into the carton, it is desirable to make the mandrel narrow enough to fit into and be encompassed by the open end of a box. However, this need for jam elimination required an even closer control over the mandrel width while the forward thrust and stabilization bar tended to reduce the ability of this packaging machine to closely control the mandrel width.

Accordingly an object of the invention is to provide new and improved automatic packaging machines. Here, an object is to provide mandrels having a variable width which may be more accurately controlled while the mandrel is being moved from one position to another position.

Still another object is to accomplish these objects while enabling the packaging machine to be operated at higher speeds.

In keeping with an aspect of the invention, these and other objects are accomplished by providing an adjustable width mandrel mounted on two sets of orthogonally related guide bars so that the mandrel, or parts thereof, has freedom to slide in both X and Y directions relative to a plane passing through a pair of substantially parallel conveyor chains that are carrying the mandrels as they are being moved by the conveyor chains. At least a pair of cam tracks are located between the conveyor chains and under the path followed by the mandrel. One of these cam tracks controls the position of the mandrel, thrusting it forward at the location or loading station where product transferred from a mandrel to a box. The second of the cam tracks cooperates with the first cam track and continuously controls the width of the mandrel as a function of the instantaneous position of the mandrel, as it is thrust forward. The stabilization bar is used in conjunction with one pair of the orthogonal bars in order to dissipate the centrifugal force acting on the mandrel while it circles the sprocket wheel.

A preferred embodiment of the invention is shown in the attached drawings, in which.

Figure 1:
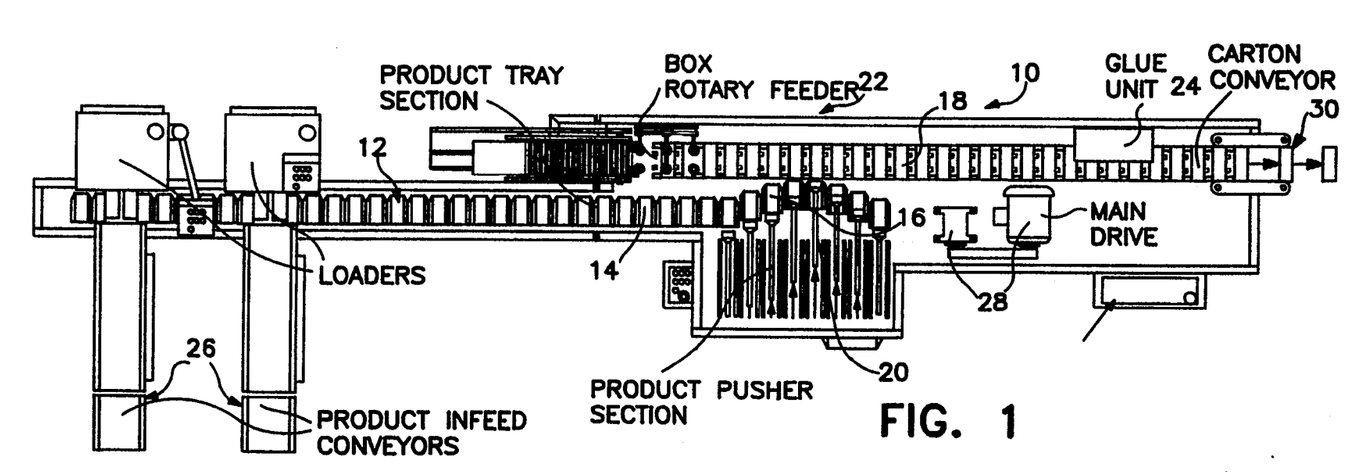
FIG. 1 is a plan view of a packaging machine incorporating the present invention.
Figure 2:
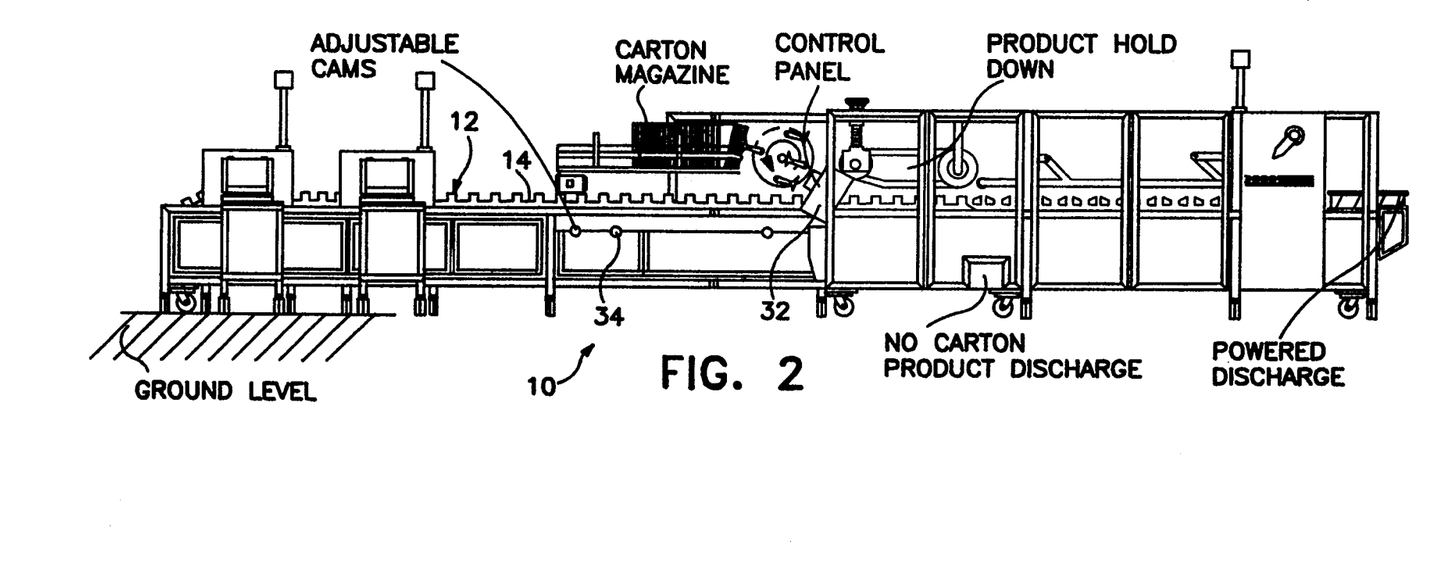
FIG. 2 is a frontal elevational view of the machine shown in FIG. 1.

Briefly, FIGS. 1 and 2 are plan and front elevational views of a high speed packaging machine 10 that utilizes the teachings of the present invention. The machine 10 includes an elongated conveyor 12 carrying adjustable width product mandrels 14 past a plurality of work stations having a thruster section 16 where the mandrels 14 are thrust forwardly at a loading station into juxtaposed relation to confronting boxes, such as box 18. The conveyors carry the mandrels 14 through a transport area 27 where they carry product to a loading station or forward thrust area 29 where product is loaded into boxes. A pusher rod 20 pushes the product from the forwardly thrust mandrel 16 into a box 18. The machine may include any other work stations having suitable modules such as a carton or box feeder 22, glue unit 24, product loaders 26, power drive units 28, discharge units 30, and miscellaneous controls 32 and adjustment means 34.

The main objects of the present invention relate to the adjustable product mandrels 16, the substantially rigid orthogonal arrangement of the slide bars supporting the mandrel and its adjusting means, the conveyor cam mechanism for controlling the narrowing and widening of the mandrels in response to the work station positions which the mandrels are in. In the loading station or thrust section, the width of the mandrels is maintained independently as it is moved into juxtaposition with the boxes for packaging the product.

Figure 3:
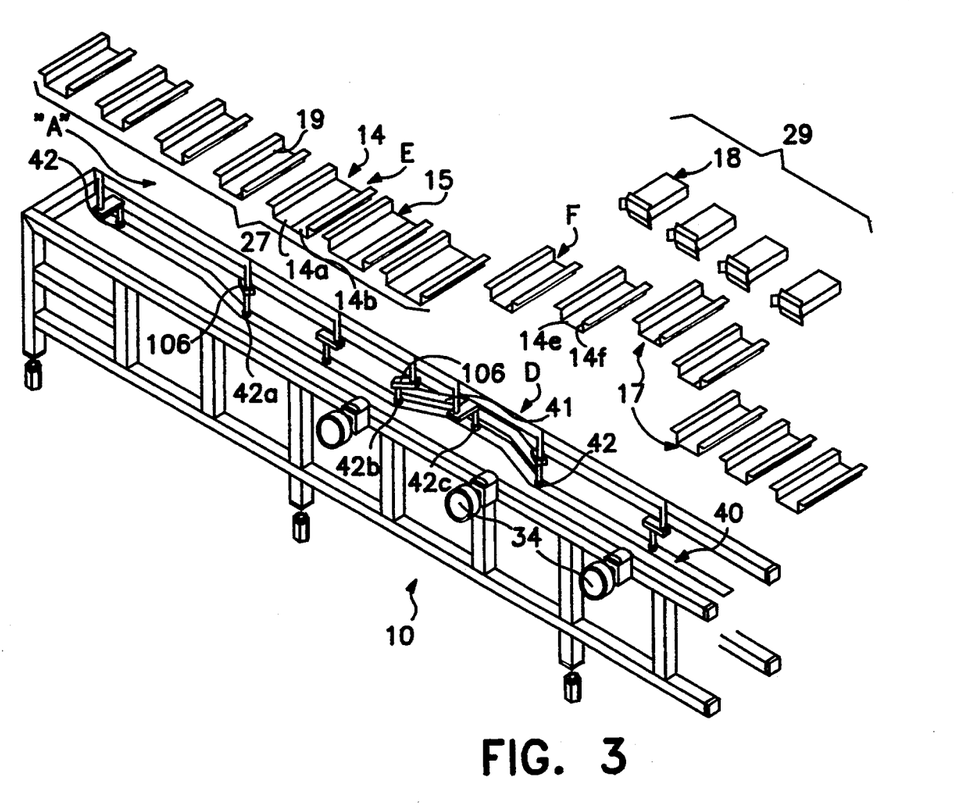
FIG. 3 is a partially exploded schematic perspective view of one of the cam tracks, referred to above, showing the movement of a mandrel width control cam follower at various positions along the track as the mandrel is moved from a position where it is at its widest to a position where it is at its narrowest and where it is thrust into proximity of a box at a loading station.
Figure 4:
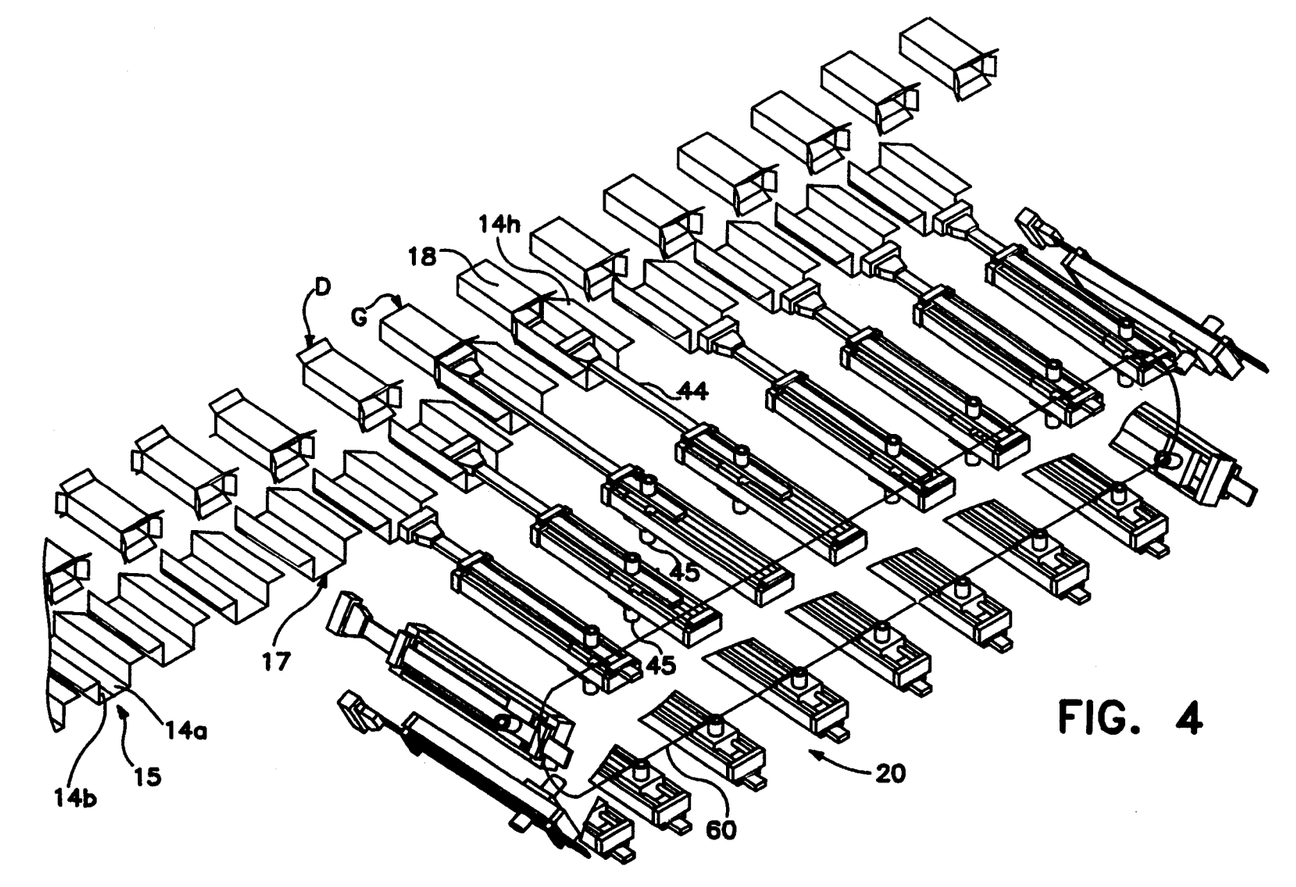
FIG. 4 is an exploded schematic perspective view showing the operation of pushers for moving product from the forwardly thrusted mandrel into the box.

In FIGS. 3 and 4, a plurality of mandrels 14 are shown in various dispositions as to their width. The mandrels 14 are generally two overlapping, L-shaped, sheet metal members 14a and 14b which divergently or convergently slide over one another to provide a product receiving wide mandrel, as indicated at 15, or a product loading narrow mandrel, as shown at 17. A product (not shown) can be properly shaped and located by being squeezed toward the center of the mandrel by an inward movement of the upright lipped sides 19, until the opposite sides 19 are spaced a distance which is complimentary to the lateral limits of the box 18.

Figure 11:
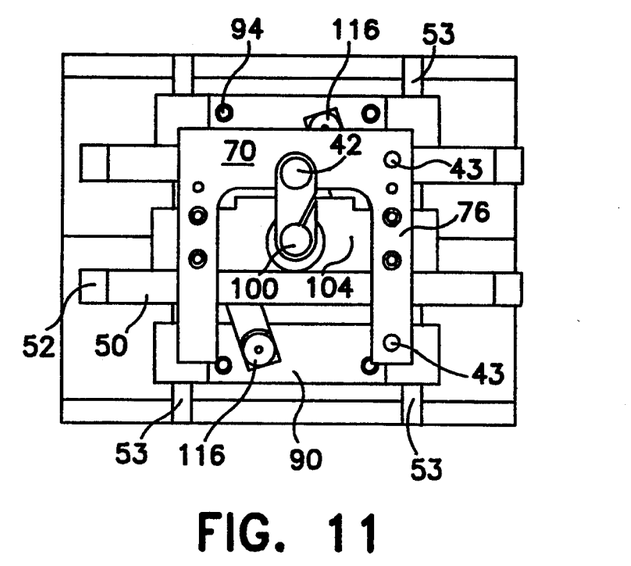
FIG. 11 is a bottom plan view of the device shown in FIGS. 6, and 8–10.
Figure 12:
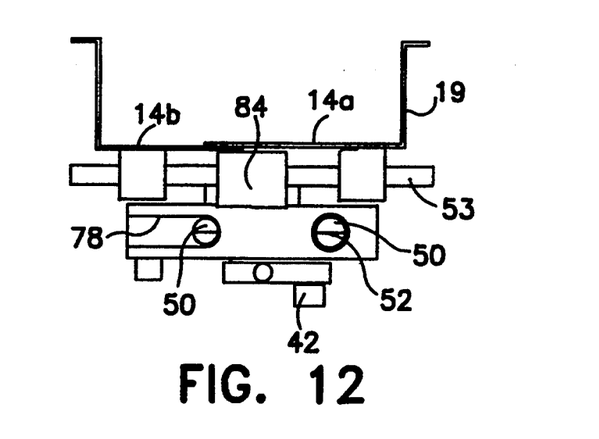
FIGS. 12 and 13 are end and side elevational views, respectively, of the device shown in FIGS. 9–11.
Figure 13:
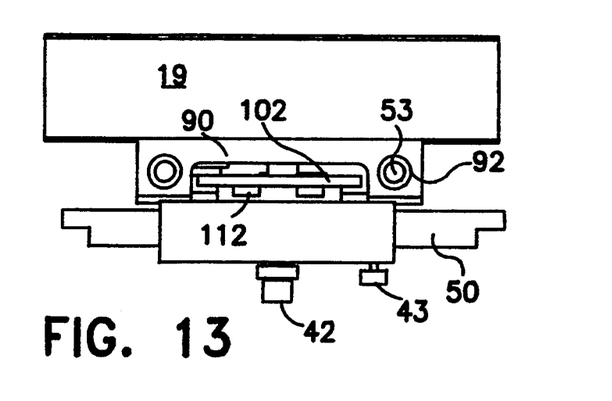

When properly positioned, the front end of this mandrel may fit into and be encompassed by this open end of the box. The mandrels 14 are carried on a pair of spaced parallel link chain conveyors. The cam slot means 40 is positioned between the conveyors and adapted to accept and guide the cam followers 42 which control the mandrel width, the operation of which is amplified hereinbelow. A second cam slot 41 engages each mandrel as it passes a loading station or thrust area and causes the mandrel to move outwardly toward the boxes 18, to a loading position. The two cam slots remain a predetermined distance from each other in the forward thrust area so that a cam follower 43, 43 (FIGS. 5, 11, 13) riding in slot 41 always retains the same (or a predetermined) spatial relationship with respect to the position of the cam follower riding in slot 40.

Figure 3A:
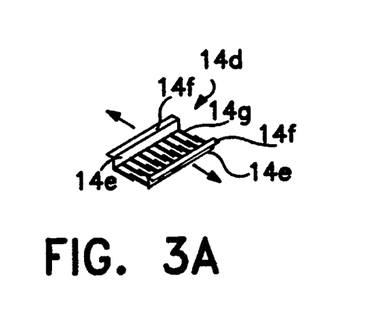
FIG. 3A is a perspective view of one form of expanded mandrel having interdigitating fingers.
Figure 3B:
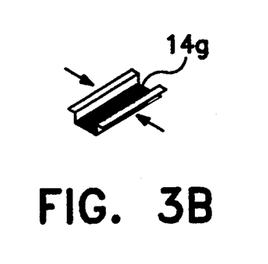
FIG. 3B is a perspective view of the form of a contracted mandrel shown in FIG. 3A.

While one form of mandrel 14 is described as being two L-shaped slidable, sheet metal, members, it is also possible to provide the configuration shown in FIGS. 3A and 3B. This mandrel 14d includes a pair of side rails 14e, each with an outwardly extending lip 14f. Extending inwardly from each of side rails 14e are a plurality of spaced, interdigitating, rigid fingers or rods 14g. The side rails are moveable together or apart in the directions indicated by the oppositely disposed arrows in these Figures, in order to vary the width of the mandrel.

Figure 6:
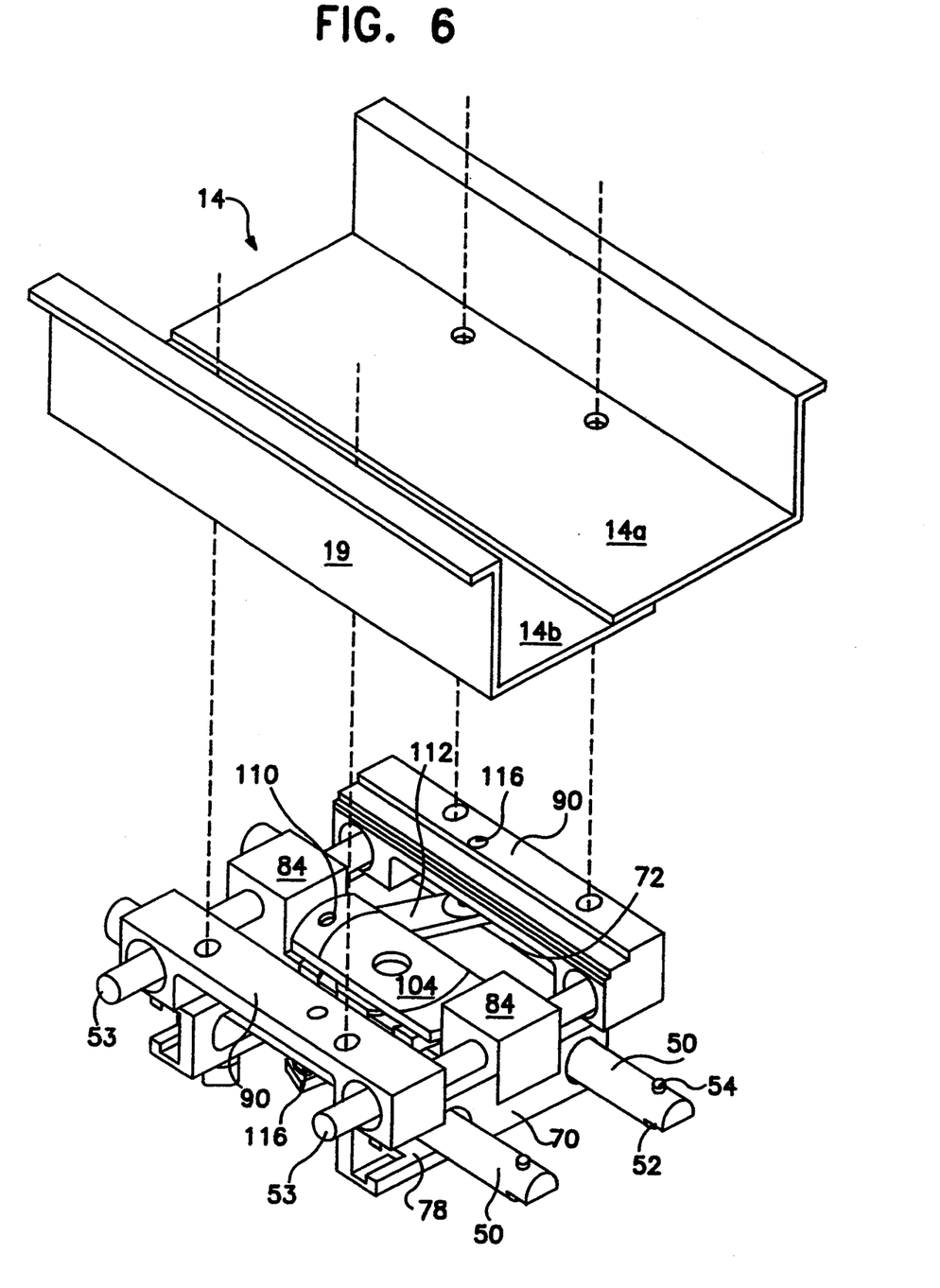
FIG. 6 is a partially exploded perspective view of an adjustable mandrel of the type contemplated, shown in a spaced relation to the orthogonally disposed bars and the cam follower mechanism.
Figure 7:
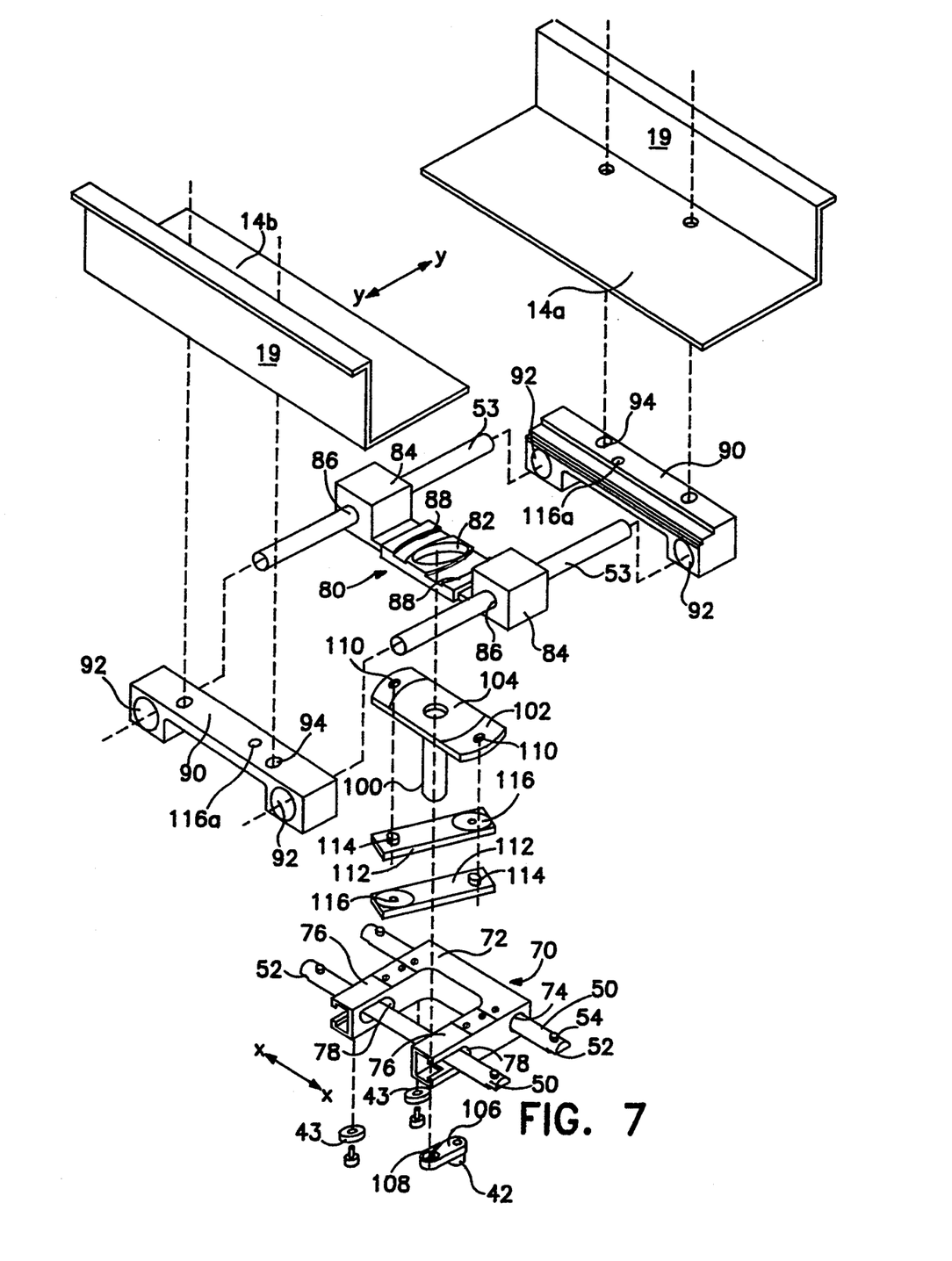
FIG. 7 is an exploded perspective view of the parts making up the cam follower mechanism and width adjustable mandrel, including the orthogonally disposed support rods, the stabilization bar, and the cam follower translation mechanism.
Figure 8:
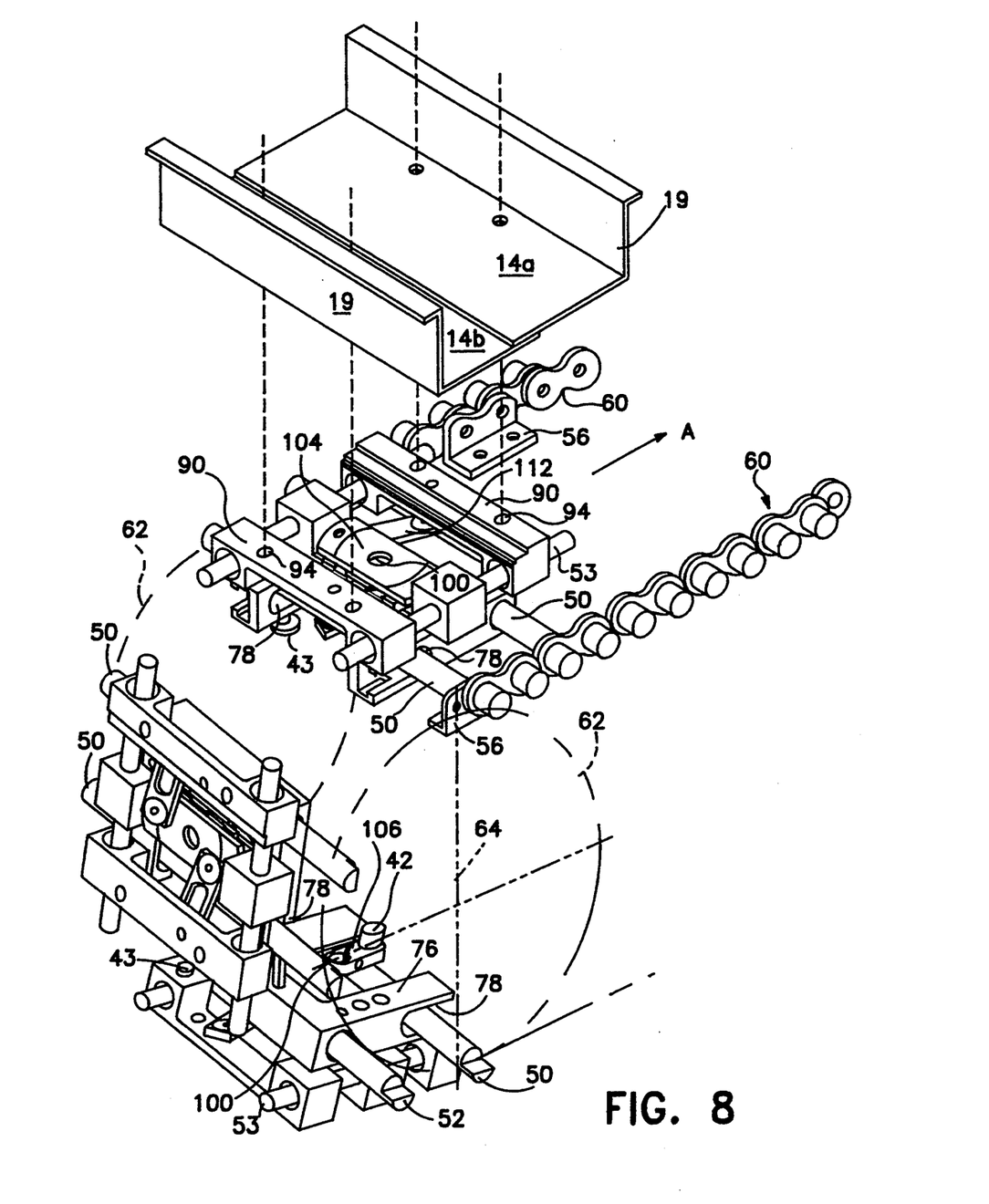
FIG. 8 is an exploded schematic perspective view showing a plurality of the cam follower mechanism of FIGS. 6 and 7, mounted in relation to a pair of parallel endless link chains forming a conveyor with the mandrel support mechanism shown in positions that would be followed around end sprockets for the chains, and with one mandrel in an exploded view relation to the conveyor and omitted for sake of clarity from the other support mechanisms.
Figure 9:
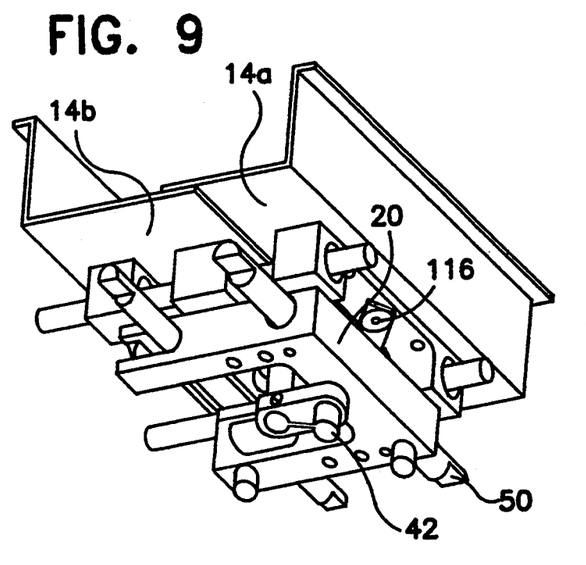
FIG. 9 is an underside perspective view of an adjustable mandrel combined with its cam follower mechanism, and showing the depending cam follower rod.
Figure 10:
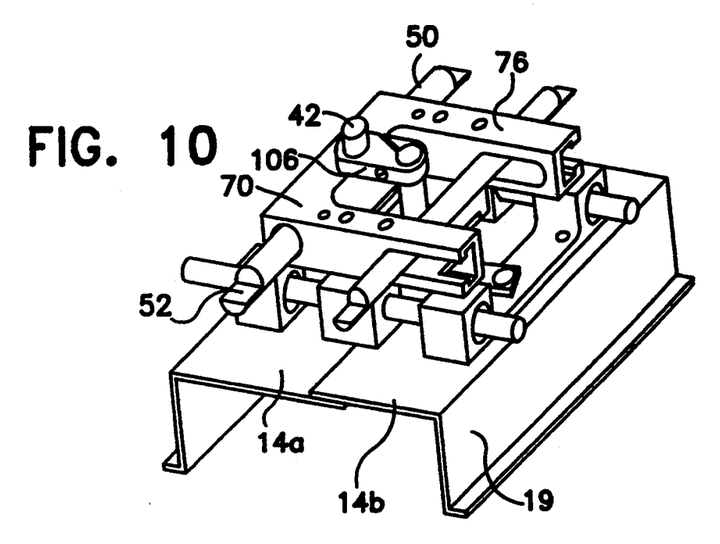
FIG. 10 is an inverted perspective view of the bottom side of an adjustable mandrel with the orthogonal disposition of the guide rods and stabilization bar, and showing the axially extending cam follower connected through its crank arm and the centrally located operating shaft leading to the adjusting mechanism.

FIGS. 6–8 show the structure and operation of the present invention which can be largely attributed to the substantially rigid orthogonally disposed pairs of parallel guide or slide rods. Rods 50, 50 extend between and are attached to the spaced parallel chain link conveyors 60, 60 that are trained over and ride on the vertically arranged sprockets 62, 62 disposed on a horizontal axis 64. For purposes of discussion, the rods 50, 50 may be described as the X-axis of the orthogonal array., They have flattened end portions 52 that are fastened by any suitable means 54 (FIG. 7), e.g. screw threaded means, onto a supporting clip 56 (FIG. 8) carried by the chains 60, 60.

A problem addressed by my co-pending application, Ser. No. 07/612,419, filed Nov. 13, 1990, now U.S. Pat. No. 5,144,790, relates to centrifugal force which causes a mandrel to try to swing outwardly in direction D1 (FIG. 7A) and slam back and forth in direction D2, D3 as the mandrel goes around the circle defined by sprocket wheels at the opposite ends of the long oval transport track. The problem becomes severe if the conveyor is driven at high speeds.

Figure 7A:
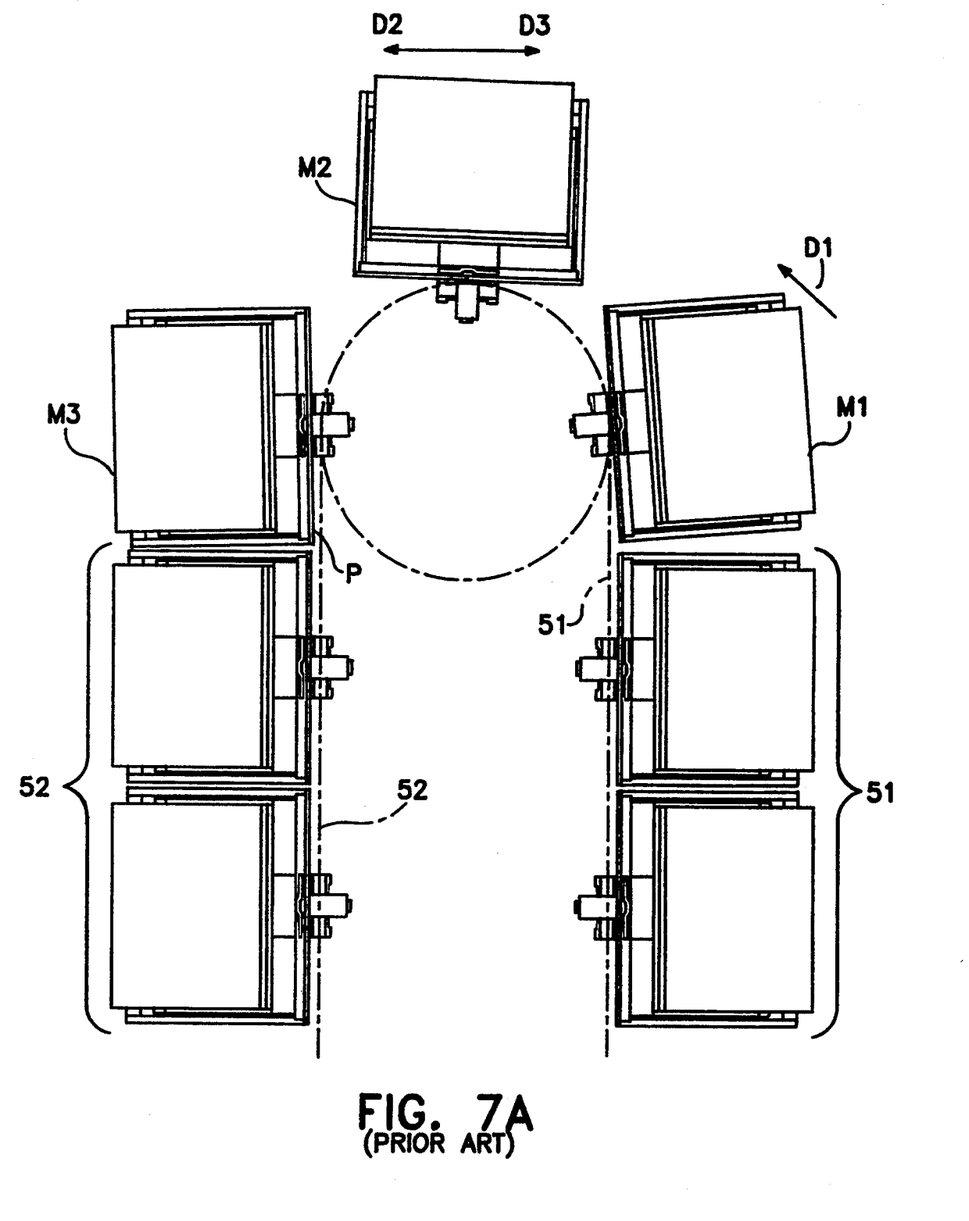
FIG. 7A is a schematic plan view of a prior art device that illustrates the problem that may be caused by centrifugal force acting on the mandrels, if a stabilization bar of the type contemplated by the present invention is not utilized.

As here shown, the mandrels travel without problems along the straight sections S1, S2 of the conveyor chain 60. However, when the mandrel enters upon the circular end section at M1, there is a strong centrifugal force tending to rotate the mandrel in direction D1. There may be a Jerkiness as the mandrel at M2 swings back and forth in directions D2, D3, when it circles the sprocket wheel. When the mandrel at M3 returns to the straight section at S2, the swinging mandrel may slam into the conveyor at point P, with a hard blow. With this kind of action, the mandrel may soon hammer itself out of shape and greatly damage the conveyor chain, especially when the mandrel is carrying heavy loads such as five or ten pounds, for example.

Heretofore, this hammering has limited the speed of the automatic packaging machine to relatively slow levels which cause a smooth transit of the circular regions of the sprocket wheel.

The invention provides means for increasing the speed of the packaging machine by a factor which may be in the order of 100%, for example, by coping with the centrifugal forces acting upon the mandrel. The invention uses a stabilizing bar with a slot which is long enough to provide travel for a guide bar carrying the mandrel in order to dissipate centrifugal forces as the mandrel traverses the circular path around a sprocket.

The slot is on a trailing edge of the mandrel support to enable the conveyor chain to pull the mandrel at a pivot point. U.S. Pat. No. 3,608, 701 shows a similar slot, but it is on a leading end of the mandrel support and only provides relief from binding, which does not do much for relief from centrifugal forces which may slam the mandrels.

In this invention, as a solution to the aforementioned problem (FIG. 7), a stabilizing bar 70 is provided which is generally U-shaped in configuration. The U has a base 72 including a through bore 74 forming bearing means riding on a leading one of the slide rods 50. Thus, base 72 may move back and forth (directions X, X) between the two conveyors. A pair of arms 76, 76 extend outwardly from opposite ends of base 72 and include enclosed slot means 78, 78 for slidable acceptance of the other spaced parallel slide rod 50.

A rigid transverse platform means 80 extends between and is mounted on the arms 76, 76 with a centrally disposed aperture 82 intermediate the arms and with a pair of blocks 84 having through bores 86 which are on arms 76. The blocks 84 accept and retain the second pair of slide rods 53, 53 which are orthogonally disposed relative the first slide rods 50, 50. The rods 53, 53 provide for back and forth sliding motion in directions Y, Y. A pair of carrier means 90, each provided with spaced bearing blocks 92, are slidably carried by slide rods 53, 53 on opposite sides of platform means 80. The oppositely disposed two halves, 14a and 14b, forming the mandrel 14 are each mounted by suitable fastener means 94 onto one of the slidable carrier means 90.

A shaft 100 is carried by a lever plate 102 which is concavely embossed at 104. The convex portion 104 of plate 102 rests within segmental bearing means 88 surrounding the central aperture 82 in the platform means 80. The shaft 100 extends downwardly through aperture 82. The cam follower 42 is carried by a crank arm 106 mounted on shaft 100. Arm 106 has an aperture 108 at the end opposite to follower 42 for acceptance of the shaft 100. The plate 102 includes oppositely disposed bearing apertures 110 that are each connected to an apertured crank 112 bearing 114. The aperture 116 at the opposite end of each crank arm 112 is suitably fastened to one of the carrier means 90 intermediate its length, as at 116a.

Thus, as it travels in the cam slot 40, the movement of the cam follower 42 causes a rotation of the shaft 100 and its attached plate 102, resulting in a convergent or divergent movement of each carrier means 90 as it slides along the slide rods 53, 53 causing the mandrel halves 14a and 14b to move inwardly or outwardly relative to the instantaneous position they are in along the cam track 40. Similarly, the platform means 80 is subject to the forces exerted by the cam follower 42 and, when directed, move along the rods 50, 50. Hence, the orthogonal relationship of the slidable movement along the X-axis and Y axis maintains the desired width of the mandrel 14 during its progression along the conveyor. These movements result in the desired thrust position of a selected mandrel width for introduction of product into a box.

Figure 5:
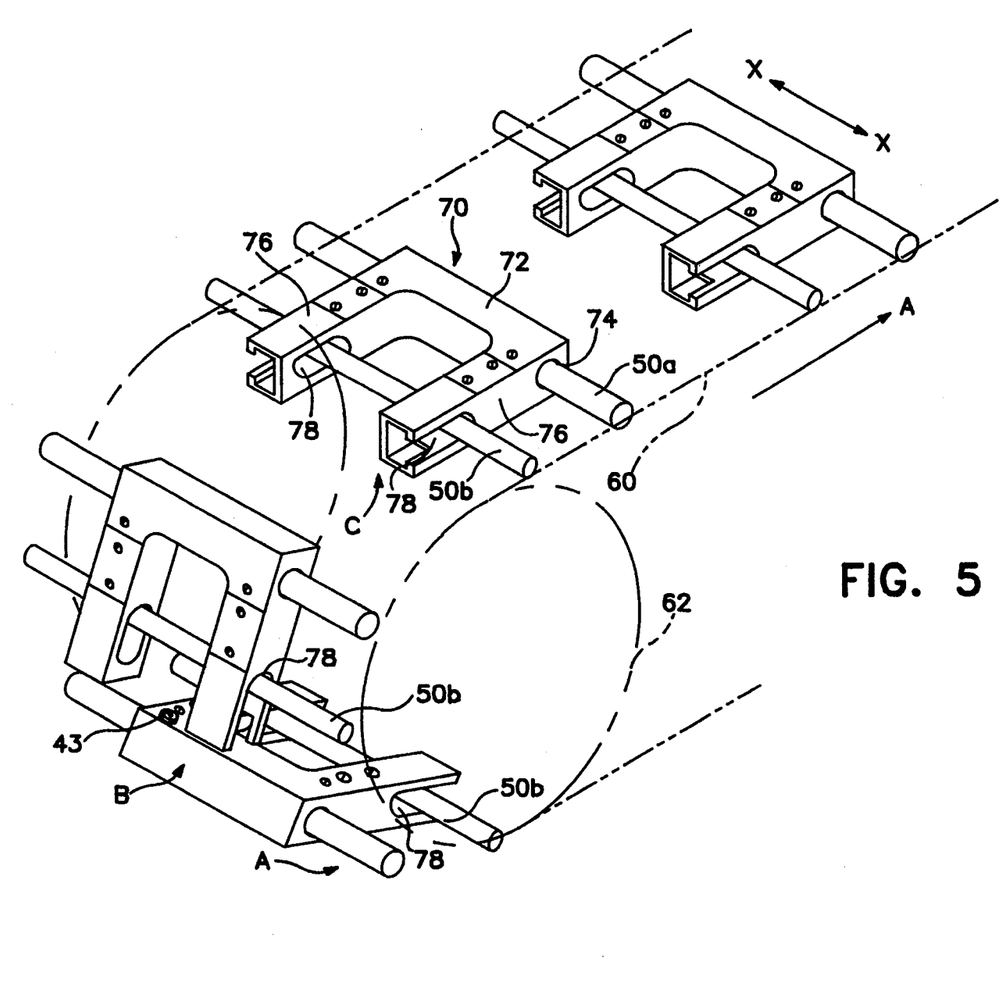
FIG. 5 is an enlarged schematic perspective view showing a plurality of the stabilization bars for supporting mandrels as the conveyor chain moves the mandrels in the direction of the arrow "A"

In operation, the conveyor chains 60, 60 circle endlessly (FIG. 4) around longitudinally displaced sprocket wheels, two of which are shown in detail at 62, 62 (FIG. 5). As they circle the sprockets, the length, weight and motion of the mandrel might cause it to rock back and forth, striking the chain unless restrained.

According to an aspect of the invention, the leading end of the mandrel is carried on a rod 50a while the trailing end of the mandrel is carried by rod 50b which is free to slide in the slots 78, 78, and thereby dissipate centrifugal forces. At the start of the excursion around the sprocket wheel, rod 50b is in the back or trailing end of the slot 78, as shown at A. At the center of the sprocket, point B, the rod 50b advances to the front or leading end of slot 78. By the time that the mandrel leaves the sprocket, point C, the rod 50b returns to the trailing end of the slot. Thus, there is no whipping back and forth responsive to centrifugal forces.

The mandrel carrying U-shaped base 72 is free to slide back and forth (directions X—X) along the bars 50, 50. Therefore, as a mandrel on the conveyor approaches the loading station or forward thrust position D (FIG. 3), cam followers (wheels) 43, 43 (FIGS. 11, 13) affixed to U-shaped platform 70 engages cam 41 causing the mandrel to approach the boxes 18 (FIGS. 3, 4) thereby defining the loading station area.

Meanwhile, as the mandrels are carried by the conveyor, the cam followers 42 follow the cam slot 40 (FIG. 3). At the position of follower 42 a, the crank arm 106 is turned to rotate shaft 100 (FIG. 7), plate 102 and lever arms 112, 112, which push apart (directions Y—Y) the mandrel sides 19, 19 that slide divergently on rods 53, 53 to make the mandrel wider, as shown at E (FIG. 3). Product is loaded into the mandrel at this wide mandrel location. Because the mandrel is wide, there does not have to be a too accurate drop of product into the mandrel, regardless of whether the product is well shaped or misshapen.

The conveyors carry the mandrels to a location shown by the cam follower 42b where the crank arm 106 is turned. Shaft 100 (FIG. 2) rotates under the driving force of the crank arm 106. This, in turn, rotates plate 102 and pulls arms 112, 112 to convergently draw in the members 90, 90 and therefore the mandrel sides 14a, 14b. At this location, the mandrel is narrow, as shown at F. If the product is misshapen, the closing of the mandrel shapes it to fit into a box. Also, the final width of the mandrel at F is suitable to fit into and be encompassed by an opening in a box, as shown at G (FIG. 4).

In the area between the positions of cam followers 42b, 42c (FIG. 3), the shapes of the two cam tracks 40, 41 are such that cam followers 42, 43 (FIGS. 11, 13) maintain a predetermined relationship with respect to each other. As here shown, the two cam followers do not move relative to each other so that the width of the mandrel does not change during the forward thrust thereof.

If some other mandrel width behavior is desirable during the forward thrust, the contours of slots 40, 41 may be given any suitable, mutual shape. For example, it could be desirable for the mandrel shape to change at the moment when it is thrust into the box.

Once the mandrel is properly positioned relative to a box, a pusher. 44 (FIG. 4) pushes product from the mandrel and into the box 18. The operation of the pushers is controlled by cam followers 45 which ride in another cam track (not shown).

While a specific embodiment has been shown and described, it should be understood that modifications will occur to those who are skilled in the art. Therefore, the appended claims should be construed to cover all reasonable equivalents.

The claimed invention is:

1. A method of conditioning a fragile product which is packaged in an automatic packaging machine having at least two conveyors, one of said conveyors transporting product and the other of said conveyors transporting containers over at least part of an established path through said packaging machine, said established path including at least a product pickup work station and a package loading work station; said method comprising the steps of:

transporting containers via said one of said conveyors and over said part of said path and past at least said package loading work station;

providing a modular variable width product reception means, said modular means being easily removable and replaceable without requiring a substantial amount of disassembly of said automatic packaging machine, per se;

transporting said modular variable width product reception means via said other of said conveyors, and over said part of said path past both of said work stations;

providing at least one cam track along at least part of said path for controlling said transporting of said modular variable width product reception means, said cam track having contours which provide a desired width behavior for said variable width product reception means;

opening said modular variable width product reception means at least once responsive to said cam track contour deviating at least once in one direction relative to said other of said conveyors in order to provide a relatively wide stance at least while passing said product pickup work station, said fragile product being received into said wide container without requiring a precise positioning and without damage to said fragile product;

closing said variable width product reception means at least once responsive to said cam track contour deviating at least once in an opposite direction relative to said other of said conveyors in order to fit said fragile product into container, said closing occurring after said modular variable width product reception means receives said product at said pickup work station and before said received product is discharged at said loading work station; and discharging said fragile product from said modular variable width product reception means into said container while in said loading work station.

2. The method of claim 1 and the added step of providing an instantaneous width control over said variable width product reception means responsive to the instantaneous position of said variable width product reception means on said other conveyor during said transporting step.

3. The method of claim 1 wherein said product may be misshapened when delivered to said relatively wide product reception means at said pickup work station, and the added step of shaping said misshapened product responsive to said closing of said product reception means, whereby said product is conditioned to fit into said container.

4. The method of claim 3 and the added step of controlling the instantaneous width behavior of said product reception means responsive to the instantaneous position of said product reception means on said path whereby said width behavior may be tailored to the particular needs for shaping said misshapen product.

5. A method of conditioning product which is packaged in an automatic packaging machine having at least two conveyors for transporting product and containers over at least an established path through said packaging machine, said established path including at least a product pickup work station and a package loading work station; said method comprising the steps of:

transporting containers via one of said conveyors and over said path past at least said package loading work station, a cam track extending along at least part of said path;

transporting a variable width product reception means via another of said conveyors, and over said path past both of said work stations;

opening said variable width product reception means responsive to said cam track deviating at least once in one direction relative to said conveyors in order to provide a relatively wide stance at least while passing said product pickup work station, whereby misshapen product may be received and said product may be deposited into said wide container without requiring precise positioning;

closing said variable width product reception means responsive to said cam track deviating at least once in an opposite direction relative to said conveyors in order to fit said product to said container, said closing occurring after said variable width product reception means receives said product at said pickup work station and before said received product is discharged at said loading work station;

discharging said product from said variable width product reception means into said container while in said loading work station; and dissipating potentially violent motion imparted to said variable width product reception means during said transporting step.

6. A method of conditioning a bagged fragile product during a transportation thereof over a conveyor in an automatic packaging machine, said conveyor extending over part of a path at least from a product pick-up station to a station for inserting said bagged fragile product into a container, said method comprising the steps of:

providing a modular product reception means having variable width vertical side walls for receiving said fragile product, providing a cam track having contours conforming to a desirable conditioning of said product., said cam track extending adjacent said conveyor, transporting said product reception means via said conveyor through at least said part of said path extending through an automatic packaging machine, and controlling the instantaneous width between said vertical side walls of said modular product reception means responsive to the contours of said cam track at instantaneous positions of said product reception means as it is being transported over said path.

7. The method of claim 6 wherein the step of controlling the width of said product reception means comprises the added step of making said product reception means relatively wide at least when in a product receiving position and relatively narrow at least when in a product loading position.

8. The method of either claim 6 or claim 7 wherein said cam track is a slot and the step of controlling the width of said product reception means comprises the added step of coordinating said contour of said slot with a desired conditioning behavior for said bagged fragile product, and providing a cam follower riding in said slot for controlling the instantaneous width behavior of the reception means according to the needs of the received bagged fragile product in order to vary the width between said side walls to gently bring a product into a desired shape or size prior to a loading of said product into a container.

* * * * *